United States Patent [19]

Kojima et al.

[11] 4,130,268

[45] Dec. 19, 1978

[54] ROTARY VALVE FOR POWDERY AND GRANULAR MATERIALS

[75] Inventors: Kenji Kojima; Tatsunori Saigusa, both of Tokyo, Japan

[73] Assignee: Hitachi Plant Engineering & Construction, Tokyo, Japan

[21] Appl. No.: 785,402

[22] Filed: Apr. 7, 1977

Related U.S. Application Data

[63] Continuation-in-part of Ser. No. 608,384, Aug. 27, 1975, abandoned.

[51] Int. Cl.² ............................................. F16K 1/16
[52] U.S. Cl. ................................. 251/298; 251/174
[58] Field of Search ............... 251/298, 304, 306, 315, 251/174; 137/874

[56] References Cited

U.S. PATENT DOCUMENTS

| 406,447 | 7/1889 | Kennedy | 137/874 |
|---|---|---|---|
| 2,321,395 | 6/1943 | Kirk | 222/353 |
| 3,181,834 | 5/1965 | Jennings | 251/172 |
| 3,241,811 | 3/1966 | Kilbourne | 251/288 |
| 3,244,002 | 4/1966 | Prono et al. | 251/174 |
| 3,404,864 | 10/1968 | Reddy | 251/174 |
| 3,485,475 | 12/1969 | Moore et al. | 251/159 |
| 3,584,833 | 6/1971 | Grenier | 251/305 |
| 3,744,755 | 7/1973 | Gary, Jr. et al. | 251/309 |
| 3,795,384 | 3/1974 | Reddy | 251/257 |
| 3,870,071 | 3/1975 | Graham et al. | 251/174 |
| 3,902,694 | 9/1975 | Friedell | 251/192 |
| 4,005,727 | 2/1977 | Williams | 251/298 |

FOREIGN PATENT DOCUMENTS

511268 10/1930 Fed. Rep. of Germany.

*Primary Examiner*—William R. Cline
*Assistant Examiner*—H. Jay Spiegel
*Attorney, Agent, or Firm*—Koda and Androlia

[57] ABSTRACT

A rotary valve disposed in a conveying passage for a powdery or granular material and comprising a valve casing and a valve member of arcuate cross section. In full closed position, the inner peripheral surface of the valve member is directed toward the flow of powdery or granular material to shut off the material flow, but in full open position, the valve member is rotated to permit conveyance of the powdery or granular material through an opening bored therein.

1 Claim, 9 Drawing Figures

ROTARY VALVE FOR POWDERY AND GRANULAR MATERIALS

This application is a continuation-in-part of application Ser. No. 608,384, filed Aug. 27, 1975 now abandoned.

BACKGROUND OF THE INVENTION

1. Field of the Invention

This invention relates to rotary valves for use in conveying systems for powdery and granular materials such as chemical materials, for example, graphite carborundum alundum, etc., and more particularly to a rotary valve of the kind above described having improved pressure shut-off means.

2. Description of the Prior Art

Rotary valves are recently widely used as an essential part of pneumatic conveying systems utilizing air pressure for the conveyance of powdery and granular materials such as chemical materials or as a means for charging or discharging powdery and granular materials such as chemical materials into or from various containers having an internal pressure different from the external pressure.

Prior art rotary valves adapted for applications of the kind above described are generally constructed to shut off gas pressure in the presence of a powdery or granular material being conveyed. Thus, in the prior art rotary valves, the powdery or granular material is inevitably present or trapped in the gap between the valve member and the sealing member which makes a frictional sealing engagement with the valve member. When the powdery or granular materials are hard as graphite, there has therefore been the tendency for the sealing member to be excessively worn resulting in an extreme reduction of the service life of the sealing member. Various means have been proposed hitherto in an effort to minimize this undesirable wear, including slowdown of the speed of swinging movement of the valve member to reduce the rate of wear of the sealing member, and employment of a special steel as the material of the sealing member. However, the former means is defective in that the amount of powdery or granular material being conveyed tends to fluctuate due to the low speed with which the rotary valve is opened and closed. The latter means is also defective in that the proportion of the cost of the rotary valve in the conveying system is increased beyond an economical level.

Another proposal has been made according to which a soft non-metallic material is employed to form the sealing member. However, employment of such a material is also defective in that the sealing member is abraded to an excessive degree due to the wear. The material thus removed is mixed into the powdery or granular material as a foreign matter.

In order to obviate various defects as pointed out above, it is necessary to resort to a method in which a rotary valve, used for shutting off the flow of powdery or granular material, is disposed separately in the material conveying passage from a gas pressure shut-off valve. According to this method, the flow of powdery or granular material is shut off temporarily by the former valve to establish a material-free atmosphere in the passage, and then the latter valve is actuated to shut off the gas pressure. However, this method is also defective in that equipment cost is extremely high since different kinds of valves must be disposed in series in the material conveying passage.

SUMMARY OF THE INVENTION

With a view to obviate various prior art defects as pointed out above, it is a primary object of the present invention to provide a novel and improved rotary valve for use in a conveying passage for a powdery or granular material, in which a single valve member having a dual function of shutting off flow of the powdery or granular material and shutting off gas pressure is provided to shut off the gas pressure in a material-free atmosphere.

The present invention provides a rotary valve for use in a conveying passage for a powdery or granular material, comprising a valve casing, an end extension of a material conveying conduit extending into the valve casing, a single valve member of arcuate cross section, for example, a semispherical shell, having an opening permitting flow of the powdery or granular material therethrough, the valve member being disposed so as to be swingable in the area of the space formed between the peripheral end edge of the end extension of the material conveying conduit and a sealing member disposed within the valve casing, whereby the flow of the powdery or granular material being conveyed through the material conveying passage is shut off by the inner peripheral surface of the valve member, and the gas pressure on the downstream side of the passage is shut off by the outer peripheral surface of the valve member making sliding sealing engagement with the inner peripheral edge of the sealing member.

BRIEF DESCRIPTION OF THE DRAWINGS

Preferred embodiments of the rotary valve according to the present invention will be described in detail with reference to the accompanying drawing.

DESCRIPTION OF THE PREFERRED EMBODIMENT

Figure 1:
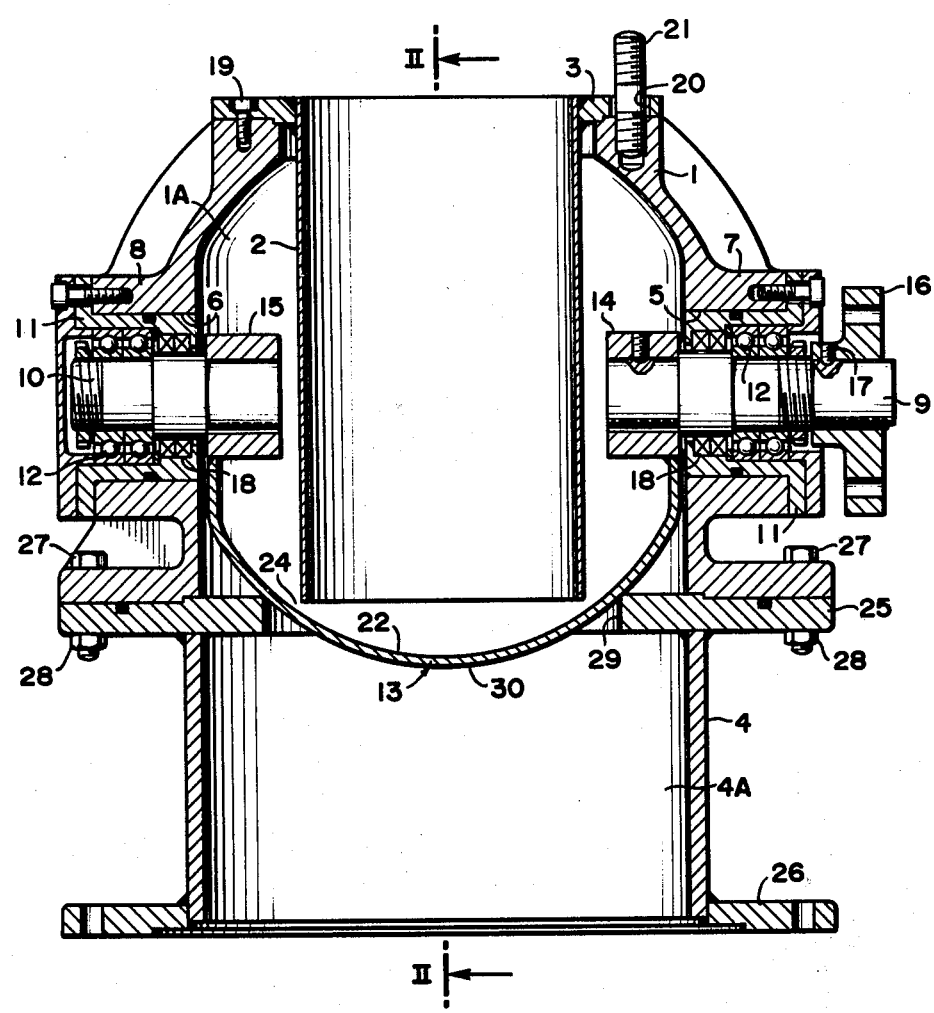
FIG. 1 is a longitudinal sectional view of an embodiment of the rotary valve according to the present invention.

Referring to FIG. 1, the rotary valve comprises an upper valve casing 1 which is substantially in the form of a vertical cylinder having a valve chamber 1A defined therein. An annular member 3 secured to the upper end of a conveying pipe 2 forming a material conveying path is mounted to the upper end of the upper valve casing 1, and a lower valve casing 4 is mounted to the lower end of the upper valve casing 1.

A pair of aligned openings 5 and 6 are bored in a substantially vertically central portion of the cylindrical wall of the upper valve casing 1 to communicate with the valve chamber 1A and a pair of collar portions 7 and 8 extend outwardly from and normal to the outer peripheral surface of the cylindrical wall of the upper valve casing 1 along the respective openings 5 and 6. A pair of shafts 9 and 10 extend from the exterior of the upper valve casing 1 into the valve chamber 1A through the collar portions 7 and 8 and openings 5 and 6 and are supported in coaxial relation by sleeves 11 and ball bearings 12, respectively. The end portions of these shafts 9 and 10 extending into the valve chamber 1A are reduced in diameter, and bosses 14 and 15 are fitted on and securely fixed to these reduced diameter end portions of the shafts 9 and 10, respectively. These bosses 14 and 15 are welded or otherwise fixed to the opposite ends of a valve member 13, of steel material.

Figure 2:
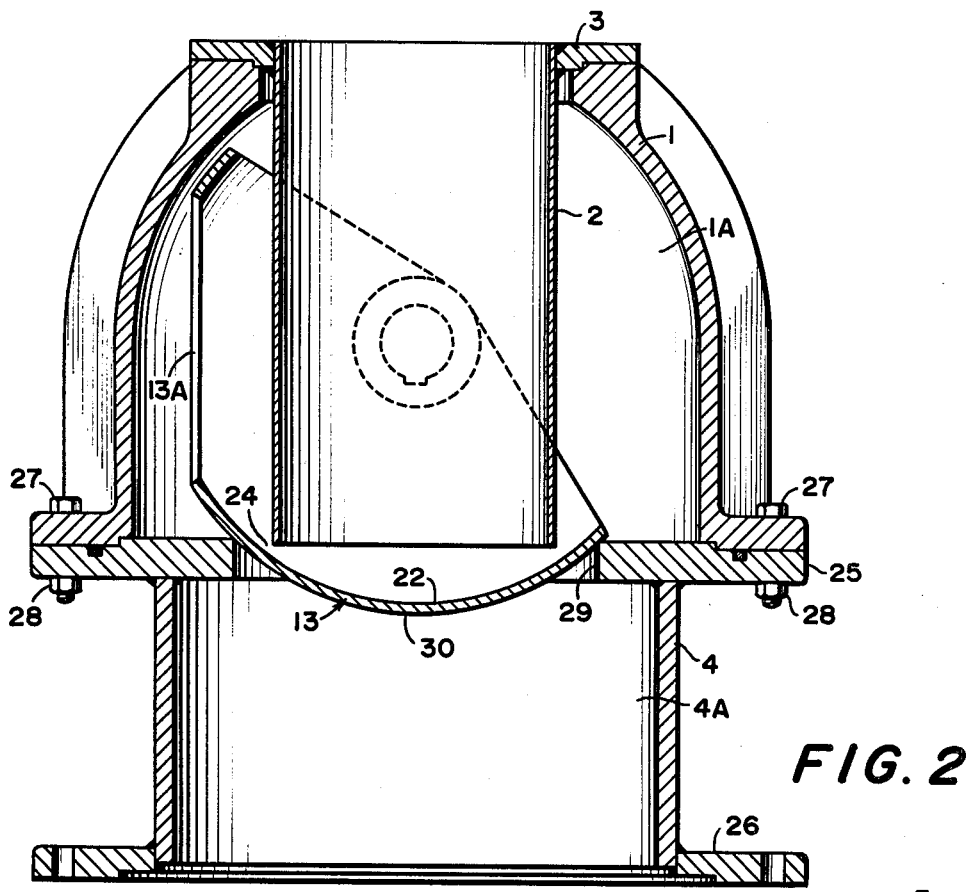
FIG. 2 is a sectional view taken along the line II—II in FIG. 1 to show the valve in full closed position.
Figure 3:
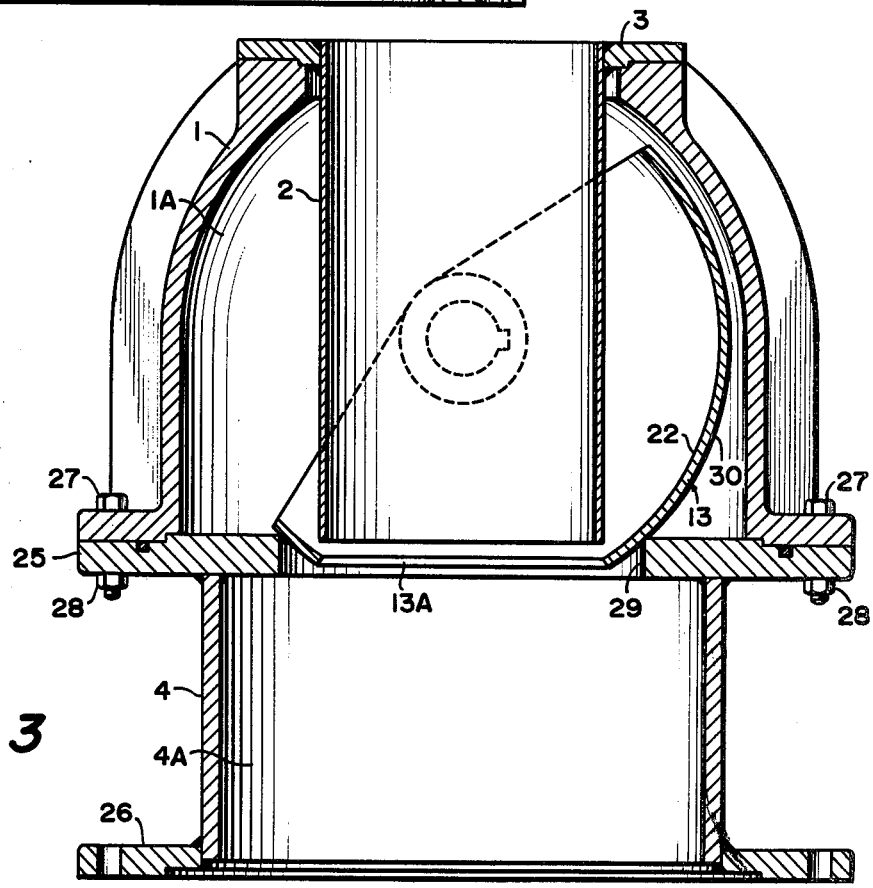
FIG. 3 is a sectional view similar to FIG. 2 but showing the valve in full open position.

The valve member 13 is substantially in the form of a shell of arcuate cross section, for example, a semispherical shell having a small wall thickness and is swingable within the valve chamber 1A around the axes of the shafts 9 and 10. As shown in FIGS. 2 and 3, an opening 13A is bored in one-half portion of the valve member 13 of semispherical shell-like shape. This opening 13A is moveable between the lower-most position corresponding to the full open position of the valve shown in FIG. 3 and the uppermost position corresponding to the full closed position of the valve shown in FIG. 2 with the swinging movement of the valve member 13.

A flange 16 is securely coaxially fixed by a setscrew 17 to the outer end of the shaft 9 outside the upper valve casing 1, and suitable drive means (not shown) for causing swinging movement of the valve member 13 is connected to the flange 16 to transmit the drive force to the shaft 9. Packings 18 are fitted between the sleeves 11 and the shafts 9 and 10 respectively to maintain the valve chamber 1A gas-tight.

The annular member 3 is tightly fixed to the upper end of the upper valve casing 1 by bolts 19, and stud bolts 21 are screwed into the upper end of the upper valve casing 1 through bolt holes 20 bored in the annular member 3 so that a powdery or granular material conveying conduit (not shown) can be connected to the annular member 3. A material conveying pipe 2 is welded at the upper end thereof to the inner peripheral edge of the annular member 3 and extends vertically downward into the valve chamber 1A, as an end extension of the material conveying conduit. The lower end of this pipe 2 terminates adjacent to the inner peripheral surface 22 of the valve member 13 of semispherical shell-like shape to define therebetween a very slight gap 24 which is minute enough to prevent passage of a powdery or granular material therethrough. This gap 24 is maintained constant at whatever angular position of the valve member 13 which makes swinging movement.

A lower valve chamber 4A is defined within the lower valve casing 4 connected to the lower end of the upper valve casing 1. A horizontally extending sealing member 25 and a horizontally extending flange 26 are welded or otherwise fixed to the upper end and lower end respectively of the lower valve casing 4. The sealing member 25 is fastened to the lower end of the upper valve casing 1 by bolts 27 and nuts 28 to firmly connect the lower valve casing 4 to the upper valve casing 1. Further, this sealing member 25 extends inwardly to separate the upper valve chamber 1A from the lower valve chamber 4A and is provided with a central opening 29. The peripheral edge of this central opening 29 of the sealing member 25 is engaged by the outer peripheral surface 30 of the valve member 13 of semispherical shell-like shape so that gas-tightness can be maintained between the upper valve chamber 1A and the lower valve chamber 4A in the full closed position of the valve shown in FIG. 2. Further, the opening 29 of the sealing member 25 has a diameter larger than the inner diameter of the conveying pipe 2.

The rotary valve embodying one form of the present invention has a construction as described above. Therefore, in the full closed position of the valve shown in FIG. 2, the central opening 29 of the sealing member 25 is tightly closed by the valve member 13, and the powdery or granular material being conveyed through the pipe 2 is received by the inner peripheral surface 22 of the valve member 13 and is thus prevented from being discharged into the lower valve chamber 4A.

When it is desired to urge the valve to the full open position shown in FIG. 3, the drive force is transmitted to the valve member 13 through the flange 16 and shaft 9 to cause counter-clockwise swinging movement of the valve member 13 from the position shown in FIG. 2 until the opening 13A of the valve member 13 registers concentrically with the central opening 29 of the sealing member 25. When these two openings 13A and 29 register with each other, the powdery or granular material can flow through the pipe 2 into the lower valve chamber 4A to be conveyed to the downstream side of the conveying passage. In this case, the internal pressure of the lower valve chamber 4A is equal to that of the pipe 2 and upper valve chamber 1A.

In the full closed position of the valve shown in FIG. 2, the powdery or granular material cannot pass through the very slight gap 24 between the lower end of the conveying pipe 2 and the inner peripheral surface 22 of the valve member 13 because the material is not a fluid but a solid. Therefore, the powdery or granular material in the conveying pipe 2 is not charged into the upper valve chamber 1A and remains stored in the conveying pipe 2 which acts now as a reservoir. Normally, the difference between the internal pressure of the conveying pipe 2 and upper valve chamber 1A and that of the lower valve chamber 4A is about 5 Kg/cm$^2$.

During the swinging movement of the valve member 13, the inner peripheral surface 22 of the valve member 13 is subject to the wear by the powdery or granular material present in the area including the gap 24. However, the degree of this wear is not so appreciable as a matter of fact because the gap 24 exists in this area.

The outer peripheral surface 30 of the valve member 13 makes sliding engagement with the peripheral edge of the central opening 29 of the sealing member 25. However, due to the fact that this surface portion extends partly into the lower valve chamber 4A and the powdery or granular material cannot accumulate on this portion by being intercepted by the valve member 13, wear does not occur at this portion, and a very slight amount of the powdery or granular material may merely be present at this portion. Therefore, this wear can also be neglected as a matter of fact.

Figure 6:
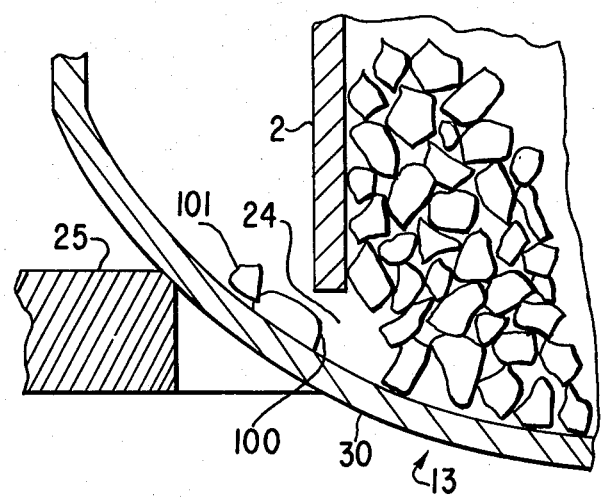
FIG. 6 is an enlarged partial sectional view of the embodiment shown in FIG. 2 illustrating the details of the closure of the rotary valve.

Referring to FIG. 6, shown therein is an enlarged partial sectional view of the embodiment shown in FIG. 2 illustrating the closure of the rotary valve. With reference to FIG. 6, a detailed description of the closure of the rotary valve will be given. In FIG. 6, the valve member 13 is closed and the granular material fills pipe 2. When the valve member 13 is closed, the granular material will stack together to cause a bridge effect at the gap 24 thereby enclosing itself within the pipe 2. As a result of the bridge effect the gap 24 can be designed to be larger than the smallest diameter of any of the granular materials flowing through the pipe 2.

Even though the granular material is enclosed within the pipe 2 as a result of the bridge effect, some pieces 101 of the granular material may occasionally pass through the gap 24. In such cases the pieces are usually very much smaller in size than the gap 24. Even a rather long piece 100 may pass through the gap 24 if its smallest dimension is very much smaller than the gap 24. These pieces 100 and 101 may move around freely within the rotary valve while the remainder of the granular material is restricted within the pipe 2 by the bridge effect.

Figure 7:
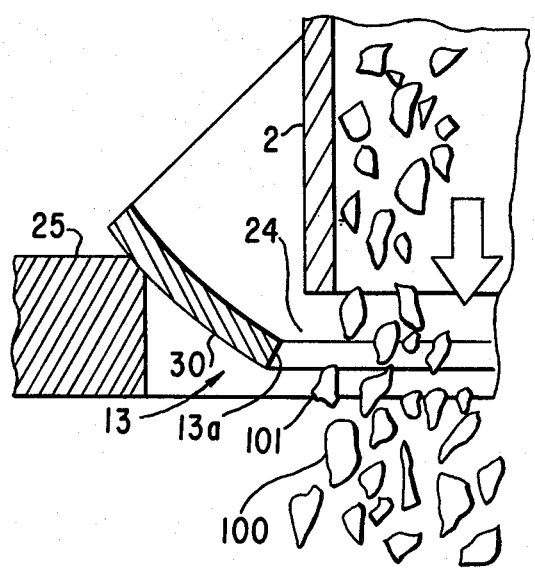
FIG. 7 is an enlarged partial sectional view of the embodiment shown in FIG. 2 illustrating the details of the opening of the rotary valve.

As shown in FIG. 7, the pieces 100 and 101 move downward with the remainder of the granular material when the valve member 13 is opened. This downward movement will be facilitated by making the diameter of the opening 13A of the valve member 13 larger than the inner diameter of the pipe 2.

Figure 8:
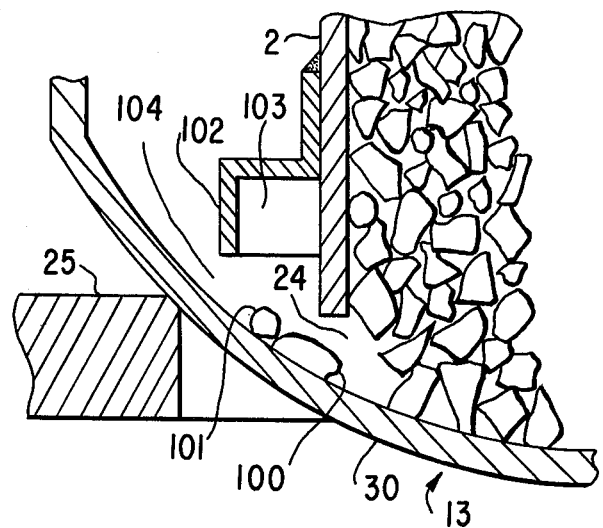
FIG. 8 is an enlarged partial sectional view illustrating a third embodiment of the present invention.

Referring to FIG. 8, shown therein is an enlarged partial sectional view illustrating a third embodiment of a rotary valve in accordance with the teachings of the present invention. In FIG. 8, a short auxiliary pipe 102 is welded to the pipe 2 with an auxiliary gap 104 provided between the end of auxiliary pipe 102 and the inside surface of valve member 13. The auxiliary pipe 102 and auxiliary gap 104 have a common center point with pipe 2. The size of the gap 104 is substantially the same as that of gap 24. Furthermore, ring-shaped space 103 is formed between the auxiliary pipe 102 and the pipe 2.

As a result of this construction, in operation pieces 100 and 101 which escape through the gap 24 are prevented by the auxiliary pipe 102 from jumping over the valve member 13 with the compressed air into the air sealing area between the valve member 13 and the sealing member 25. As a result therefor, the pieces 100 and 101 in the space 103 will move downwardly with the remainder of the granular material in pipe 2 when the rotary valve is opened as shown in FIG. 7.

Figure 9:
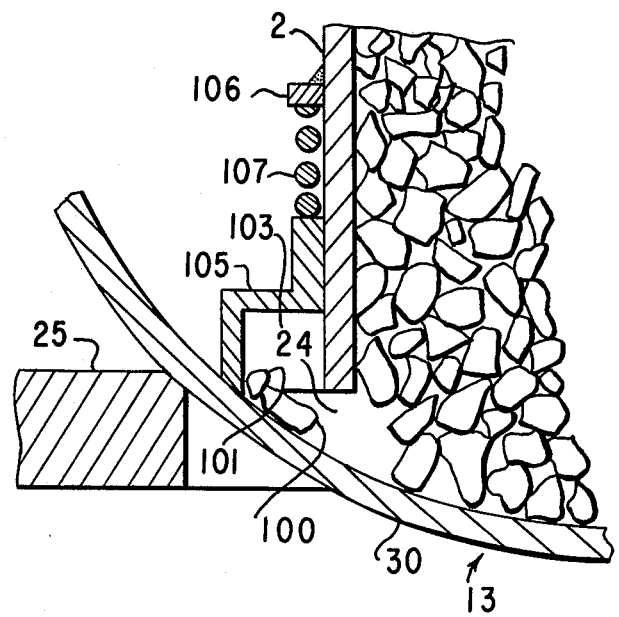
FIG. 9 is an enlarged partial sectional view of a fourth embodiment of the present invention.

Referring to FIG. 9, shown therein is an enlarged partial sectional view of another embodiment of a rotary valve in accordance with the teachings of the present invention. In FIG. 9, a slidable auxiliary pipe 105 is provided concentric with pipe 2. The pipe 105 is spring-loaded by a coil spring 107 which is fixed to a stopper 106 in such a manner that the lower end of auxiliary pipe 105 is urged into contact with the inner surface of valve member 13. Accordingly, the pieces 100 and 101 which would normally escape through the gap 24 are completely prevented from escaping by the pipe 105 and will move downwardly with the remainder of the granular material when the valve member 13 is opened as shown in FIG. 7.

Although the above description of the embodiments of the present invention has referred to the case in which the valve member 13 is of semispherical shell-like shape, the present invention is in no way limited to such specific shape and any other suitable shape may be employed. For example, the outer peripheral surface 30 of the valve member 13 may have any suitable arcuate contour. In such a case, the shape of the central opening 29 of the sealing member 25 may be modified correspondingly to ensure sliding engagement of the outer peripheral surface 30 of the valve member 13 with the peripheral edge of the central opening 29 of the sealing member 25.

It will be understood from the foregoing detailed description of the embodiments of the rotary valve according to the present invention that the valve member disposed in a conveying passage for a powdery or granular material is adapted to make sliding engagement at the outer peripheral surface thereof with the peripheral edge of a central opening of a sealing member so that, during shut off of the flow of the powdery or granular material by the valve, the gas pressure can be shut off in an atmosphere in which no material exists on the downstream side of the passage. According to the present invention, occurrence of wear on the sealing member by the powdery or granular material due to the swinging movement of the valve member can be substantially completely avoided in a conveying passage in which there is a pressure difference between the upstream side and the downstream side. Therefore, undesirable wear of the sealing member can be remarkably reduced, and the service life of the sealing member can be greatly extended even when the sealing member is of inexpensive material. Thus, the valve member can be actuated at a high speed to quickly open or close the conveying passage. Further, even when a soft non-metallic material is used to form the sealing member, removal of the material by abrasion is limited to a very small amount, and the possibility of mixing of the removed material into the powdery or granular material as a foreign matter can be minimized.

The rotary valve according to the present invention is very simple in construction and can be manufactured at a low cost due to the fact that the single valve member has the dual function of shutting off the flow of powdery or granular material and shutting off the gas pressure.

Figure 4:
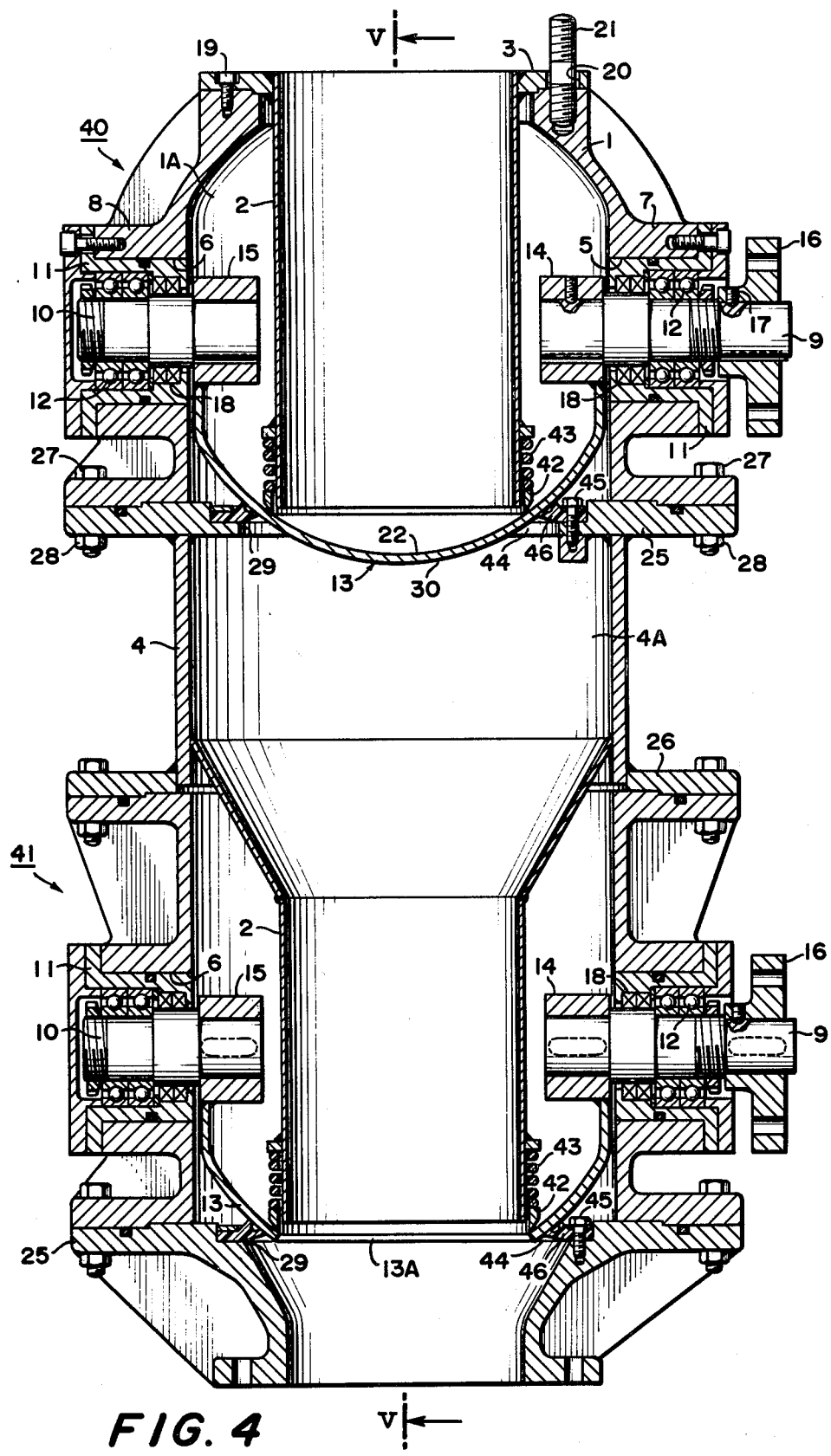
FIG. 4 is a longitudinal sectional view of another embodiment of the present invention.
Figure 5:
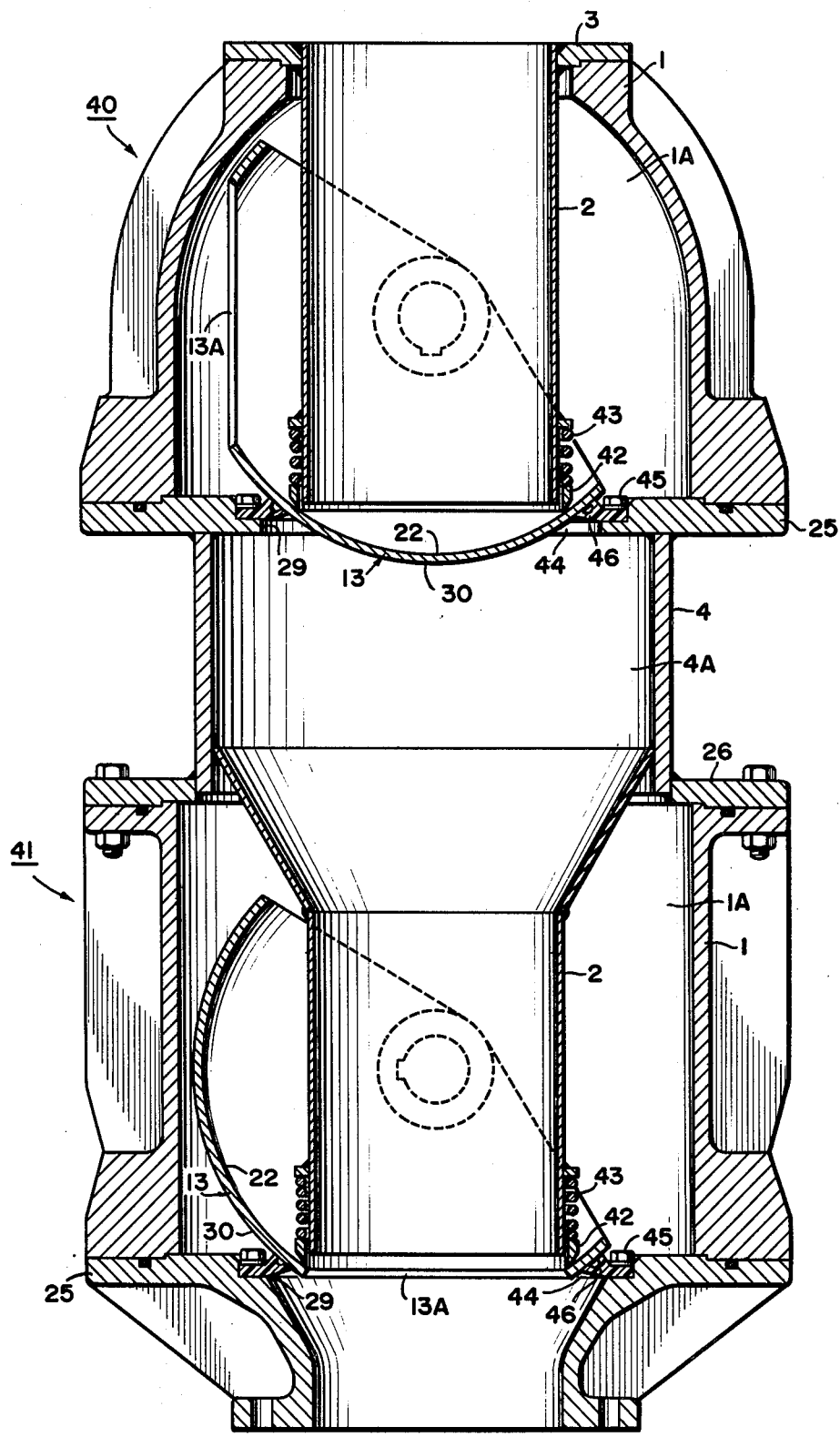
FIG. 5 is a sectional view taken along the line V—V in FIG. 4.

FIGS. 4 and 5 show a second embodiment of the rotary valve according to the present invention. The rotary valve shown in FIGS. 4 and 5 is of two-stage construction comprising a first rotary valve unit 40 and a second rotary valve unit 41 connected in series in a conveying passage for a powdery or granular material. In each of these valve units 40 and 41, a shut-off member 42 is slideably mounted on an outer peripheral surface portion of a conveying pipe 2, and a spring 43 is provided to press the lower end of the shut-off member 42 against the inner peripheral surface 22 of a valve member 13 which may have a shape as described with reference to FIGS. 1 through 3. Further, in each of the valve units 40 and 41, a space 44 is formed between the outer peripheral surface 30 of the valve member 13 and the peripheral edge of a central opening 29 of a sealing member 25. Another sealing member 46 of resin material, which is firmly fixed at the radially outer end thereof to the sealing member 25 by bolts 45, is pressed at the radially inner end thereof against the outer peripheral surface 30 of the valve member 13 in the space 44 to close this space 44. The upper end portion of the conveying pipe 2 in the second rotary valve unit 41 is tapered to terminate in a large diameter end which is welded to the inner wall of a lower valve casing 4 of the first rotary valve unit 40. The structure of remaining parts of the rotary valve units 40 and 41 is similar to that described with reference to FIGS. 1 through 3.

The second embodiment of the present invention operates in a manner as described below.

In the state shown in FIGS. 4 and 5, the first rotary valve unit 40 is in full closed position and the second rotary valve unit 41 is in full open position, when a powdery or granular material is conveyed into the conveying pipe 2 in the first rotary valve unit 40 in such a state, the powdery or granular material fills the space within the conveying pipe 2 but cannot be discharged into the second rotary valve unit 41 since the valve member 13 of the first rotary valve unit 40 is in the position closing the passage.

Subsequently, the valve actuating force is imparted to the flanges 16, hence the shafts 9 connected to the valve members 13 of the first and second rotary valve units 40 and 41 to cause counter-clockwise swinging movement of the valve members 13 in FIG. 5 so as to place now the first rotary valve unit 40 in full open position and the second rotary valve unit 41 in full closed position respectively.

As a result, the opening 13A of the valve member 13 registers concentrically with the central opening 29 of the sealing member 25 in the first rotary valve unit 40. The powdery or granular material having been retained in the conveying pipe 2 is discharged into the second rotary valve unit 42 and fills the space within the conveying pipe 2 in the valve unit 41 since the flow of the material is intercepted by the valve member 13 of the second rotary valve unit 41. Then, when the valve members 13 of the first and second rotary valve units 40 and 41 are swung clockwise, the first rotary valve unit 40 is placed in full closed position and the second rotary valve unit 41 is placed in full open position again. The powdery or granular material having been retained in the second rotary valve unit 41 is discharged through the opening 13A of the valve member 13 and the central opening 29 of the sealing member 25 in the second rotary valve unit 41, and a new material charge is conveyed into the conveying pipe 2 in the first rotary valve unit 40. This manner of operation is repeated so that the powdery or granular material of constant amount can be continuously conveyed from the upstream side toward the downstream side of the material conveying passage.

It will be understood from the foregoing description of the second embodiment of the present invention that the first and second rotary valve units 40 and 41 capable of alternately shutting off the material flow are connected in series in a conveying passage for a powdery or granular material, and the valve members 13 of these rotary valve units 40 and 41 are alternately swung between the full open and full closed positions so that the powdery or granular material received in the conveying pipes 2 can be successively and continuously discharged or conveyed toward the downstream side of the conveying passage. Thus, the second embodiment has, in addition to the advantages of the first embodiment, such advantages that the amount of a powdery or granular material being conveyed can be maintained constant free from any fluctuation and the material can be conveyed reliably to any desired place regardless of the presence of a pressure differential across the valve.

Although a rotary valve of two-stage construction has been illustrated in FIGS. 4 and 5 by way of example, it is apparent to those skilled in the art that the rotary valve may have three or more stages when so desired.

We claim:

1. A rotary valve for use in a conveying passage for granular material consisting of a vertically disposed valve casing, a sealing means fixed to the downstream end of said valve casing and having a central opening permitting passage of said granular material therethrough, a tubular material conveying path member vertically disposed within said valve casing and extending in the direction of material flow to terminate in a lower end adjacent to said sealing means to define a first gap therebetween, and a valve member disposed to be swingable within said valve casing for making slidable engagement with said central opening of said sealing means in the area of said first gap defined between said sealing means and said end of said material conveying path member, a short auxiliary pipe larger in diameter than said conveying path member and fixed to the path member such that a ring-shaped space is formed between the auxiliary pipe and an outside surface of said path member and such that a lower end of said auxiliary pipe forms a second gap with said inner peripheral surface of said valve member which is larger than said particles, said valve member being spaced around said conveying path member such that an inner peripheral surface of said valve member and said end of said conveying path member form a third gap which is larger than said particles, is the same as said second gap and is configured such that a bridge effect prevents said granular material from passing therethrough, said valve member having an opening to permit passage of the material therethrough when said opening registers with said central opening of said sealing means and said opening is larger than an inner diameter of said path member, said central opening having a greater areal extent than and substantially circumscribing said opening in said valve member so that contact between said sealing means and said granular material is substantially avoided.

* * * * *